United States Patent [19]

Dennis

[11] Patent Number: 5,120,327
[45] Date of Patent: Jun. 9, 1992

[54] CUTTING COMPOSITE FORMED OF CEMENTED CARBIDE SUBSTRATE AND DIAMOND LAYER

[75] Inventor: Mahlon D. Dennis, Kingwood, Tex.

[73] Assignee: Diamant-Boart Stratabit (USA) Inc., Houston, Tex.

[21] Appl. No.: 664,651

[22] Filed: Mar. 5, 1991

[51] Int. Cl.⁵ .............................................. B24D 3/00
[52] U.S. Cl. ..................... 51/293; 76/108.2; 76/DIG. 11; 76/DIG. 12; 407/119
[58] Field of Search ............... 76/108.1, 108.2, 108.4, 76/DIG. 11, DIG. 12; 408/144, 145, 713; 51/293, 295, 297, 307, 309; 407/119, 118

[56] References Cited

U.S. PATENT DOCUMENTS

| | | |
|---|---|---|
| 4,109,737 | 8/1978 | Bovenkerk . |
| 4,478,298 | 10/1984 | Hake et al. . |
| 4,604,106 | 8/1986 | Hall et al. . |
| 4,784,023 | 11/1988 | Dennis ..................... 408/145 |
| 4,861,350 | 8/1989 | Phaal et al. . |
| 4,972,637 | 11/1990 | Dyer ........................... 51/295 |

Primary Examiner—Roscoe V. Parker
Attorney, Agent, or Firm—Burns, Doane, Swecker & Mathis

[57] ABSTRACT

A composite for cutting in subterranean formations comprises a cemented carbide substrate and a diamond layer adhered to a surface of the substrate. That surface includes a plurality of spaced apart ridges forming grooves therebetween. The diamond layer has a thickness greater than a depth of the grooves and occupies the grooves to interlock with the substrate. The diamond is comprised of a substantially uniform distribution of diamond particles having a grain size in a range of about 25–75 microns. The ridges are spaced radially inwardly from an outer periphery of the substrate, whereby the diamond layer includes an annular ring portion completely surrounding the plurality of ridges to provide radial reinforcement against the formation and propagation of cracks tending to occur in the vicinity of the ridges.

6 Claims, 2 Drawing Sheets

CUTTING COMPOSITE FORMED OF CEMENTED CARBIDE SUBSTRATE AND DIAMOND LAYER

BACKGROUND OF THE INVENTION

The present invention relates to cutting elements, particularly of the type in which a diamond layer is adhered to a carbide substrate to form a composite, and the composite is bonded to a support stud.

One type of cutting element used in rotary drilling operations in earth formations comprises an abrasive composite or compact mounted on a stud. The composite typically comprises a diamond layer adhered to a cemented carbide substrate, e.g., cemented tungsten carbide, containing a metal binder such as cobalt, and the substrate is brazed to the stud. Mounting of the cutting element in a drill bit is achieved by press-fitting or otherwise securing the stud into predrilled holes in the drill bit.

Fabrication of the composite is typically achieved by placing a cemented carbide substrate into the container of a press. A mixture of polycrystalline diamond grains and catalyst binder is placed atop the substrate and is compressed under ultra-high pressure and temperature conditions. In so doing, metal binder migrates from the substrate and "sweeps" through the diamond grains to promote a sintering of the diamond grains. As a result, the diamond grains become bonded to each other to form a diamond layer, and that diamond layer is bonded to the substrate along a planar interface. Metal binder remains disposed in the diamond layer within pores defined between the diamond grains.

A composite formed in that manner may be subject to a number of shortcomings. For example, the coefficients of thermal expansion of cemented carbide and diamond are close but not exactly the same. Thus, during heating or cooling of the composite, thermally induced stresses will occur at the interface between the diamond layer and cemented carbide substrate, the magnitude of the stresses being a function of the disparity in the thermal expansion coefficients. Another potential shortcoming which should be considered relates to the creation of internal stresses within the diamond layer which can result in a fracturing of that layer.

Those shortcomings were greatly alleviated by a cutting element disclosed in U.S. Pat. No. 4,784,023 issued to the present inventor on Nov. 15, 1988. That cutting element (depicted in the accompanying FIGS. 5 and 6) comprises a cemented carbide substrate having a surface formed with alternating ridges 2 and grooves 3. Each groove is formed by a pair of opposing side surfaces 4 interconnected by a base surface 5. When the diamond layer 6 is formed on the surface of the substrate, diamond particles will fill the grooves, whereby the final diamond layer will contain alternating ridges and grooves interlocked with the grooves and ridges of the substrate.

That cutting element alleviates the above-described shortcomings. That is, metal binder is very uniformly dispersed throughout the ridges of the diamond layer, whereby the occurrence of concentrated stresses is resisted. Also, the presence of the metal binder in the diamond layer maximizes the impact resistance of the diamond layer and provides for the attenuation of cracks resulting from back-conversion of the diamond grains. Also, the presence of the zone comprised of alternating ridges of diamond and cemented carbide serves to minimize the magnitude of thermally induced stresses between the diamond layer and the cemented carbide layer by acting as a graded stress interface.

Notwithstanding the above-described advantages achieved by the cutting element disclosed in U.S. Pat. No. 4,784,023, certain shortcomings have been observed. For example, the intersection of the side and base surfaces 4, 5 of the substrate grooves gives rise to a so-called notch effect, i.e., a tendency for cracks 7 to initiate in the vicinity of those intersections in response to the cutting loads imposed on the cutting action. Eventually, those cracks may propagate radially and result in pieces of the substrate and diamond breaking away from the cutting element. As a consequence, the useful life of the cutting element is shortened. It would be desirable to suppress the tendency for the cracks to form and propagate.

SUMMARY OF THE INVENTION

The present invention relates to a composite for cutting in subterranean formations, comprising a substrate formed of cemented carbide and including a surface having a plurality of spaced apart ridges forming grooves therebetween. The ridges are spaced radially inwardly from an outer periphery of the substrate. A sintered diamond layer is adhered to the surface of the substrate and has a thickness greater than a depth of the grooves. The diamond is comprised of a substantially uniform distribution of diamond particles having a grain size in a range of about 25-75 microns. The diamond layer occupies the grooves to form diamond ridges interlocked with ridges of the substrate. The diamond layer includes an annular ring portion completely surrounding the plurality of ridges and extending to a depth at least equal to that of the grooves to provide radial reinforcement against the formation and propagation of cracks tending to occur in the substrate in the vicinity of the ridges.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
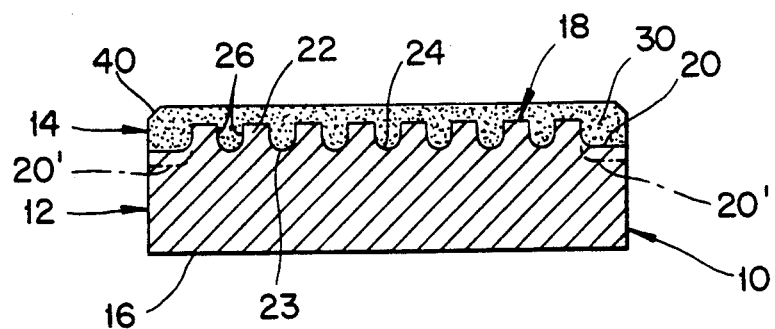
FIG. 1 is a cross-sectional view taken through a composite according to the present invention, the cross-section being taken along line 1—1 in FIG. 2.

A composite or compact 10 according to the present invention comprises a substrate 12 formed of a cemented carbide, and a diamond layer 14 adhered thereto. The diamond layer may comprise polycrystalline diamond, for example.

The cemented carbide substrate 12 is of circular cylindrical shape and comprises a first surface 16 which is substantially planar, and a second surface 18 which includes a plurality of spaced apart, parallel ridges 22. A plurality of parallel grooves 24 are formed between adjacently disposed ones of the ridges.

The ridges terminate short of the outer periphery of the substrate, whereby a floor section 20 of the surface 18 completely surrounds the group of ridges. Each groove is formed by two parallel side surfaces 26 of associated ridges 22, and a curved base 23.

The composite is typically manufactured by initially fabricating (e.g., by sintering) the cemented carbide substrate 12 having smooth top and bottom surfaces. Then, the ridges 22 are formed in the surface 18 by a suitable cutting or etching process. The ridges can have parallel side surfaces 26 as shown, whereby the width of each ridge is uniform through its length and depth. Alternatively, the side surfaces can be mutually inclined to form ridges having a dove-tail cross-sectional shape. The recessed substrate is then placed in a conventional press and grains of polycrystalline diamond are applied to the surface 18 of the substrate, to a level above the ridges 22. The diamond grains and cemented carbide substrate are then subjected to ultra-high pressure and temperature conditions, whereupon the gains of diamond are bonded to each other and to the cemented carbide substrate. The principles of that pressing step are explained, for example in Wentorf, Jr. U.S. Pat. No. 3,767,371.

The diamond completely fills the grooves 24 and the area surrounding the ridges 22. The diamond disposed within the grooves 24 thus forms ridges which interlock with the ridges 22 of the substrate. The advantages contributed to that process by the presence of ridges 22 and grooves 24 are explained in U.S. Pat. No. 4,784,023.

For example, during the application of heat and pressure in the press, the binder metal, e.g., cobalt, weeps out of the cemented carbide and passes through the diamond by liquid diffusion. In so doing, the cobalt sinters the diamond grains and occupies pores disposed between the diamond grains. It has been found that the presence of the ridges and grooves enables the metal binder to become more uniformly dispersed throughout the ridges of the diamond layer. In that regard, it will be appreciated that the presence of ridges and grooves increases the total surface area (interface) between the diamond and cemented carbide, thereby increasing the surface area from which cobalt may flow. Furthermore, the distance by which the cobalt must travel is reduced since the cemented carbide ridges project well into the diamond layer. Also, the cobalt is able to flow through the diamond ridges in three directions rather than in merely a single direction. Consequently, the metal binder is more uniformly dispersed throughout the diamond layer. For reasons discussed earlier herein, such uniform dispersion resists the creation of stress concentrations in the diamond layer when the composite is heated or cooled, because the stresses, being randomly directed, tend to resist one another and are thus self-balancing.

It will also be appreciated that a composite formed in accordance with the present invention minimizes the thermal stresses occurring between the diamond and cemented carbide. In that regard, it will be appreciated that in the case of a prior art composite containing a planar interface between the diamond layer and substrate, the difference in the thermal expansion coefficients between those two components creates stresses at the interface. However, the composite according to the present invention may be considered as comprising three zones, i.e., a zone of diamond, a zone of cemented carbide, and an intermediate zone composed of the diamond and carbide ridges. That intermediate diamond/carbide zone thus has a coefficient of thermal expansion whose value is about halfway between the coefficients of the diamond and cemented carbide zones. As a result, the intermediate zone functions as a buffer or graded stress interface to minimize the stresses occurring between the diamond and cemented carbide zones.

Furthermore, it is believed that the amount of thermally induced stress occurring between the diamond and cemented carbide components is a function of the size of the continuous, unbroken area of the interface between those components. In the present invention, the interface has been broken by the grooves into a series of smaller areas, and the stresses occurring in those areas are, it is believed, not cumulative, whereby the overall stress is much less than would be the case in the absence of the ridges and grooves, i.e., in the case of a planar interface.

It will thus be appreciated that the metal binder is very uniformly dispersed throughout the ridges of the diamond layer, whereby the occurrence of concentrated stresses is resisted. Also, the presence of the metal binder in the diamond layer maximizes the impact resistance of the diamond layer and provides for the attenuation of cracks resulting from back-conversion of the diamond grains.

The presence of the intermediate zone comprised of alternating ridges of diamond and cemented carbide serves to minimize the magnitude of thermally induced stresses between the diamond layer and the cemented carbide layer by acting as a graded stress interface. That is, the value of the coefficient of thermal expansion of that intermediate zone is about midway between that of diamond and cemented carbide. Actually, the thermal coefficients of diamond and cemented carbide are relatively close (i.e., about 45 cm./cm./°C.$\times 10^{-7}$ for diamond and about 60-65 cm./cm./°C.$\times 10^{-7}$ for cemented carbide). Thus, the coefficient of the intermediate layer is about 52-55 cm./cm./°C.$\times 10^{-7}$ which reduces the thermally induced stresses to tolerable levels.

As noted above, those advantages are explained in U.S. Pat. No. 4,784,023. In accordance with the present invention, the diamond surrounding the group of ridges 22 (i.e., the diamond disposed over the floor 20) forms a generally circular ring portion 30 of uniform width W which shrinks as the composite cools, and thereby contracts radially inwardly against the group of ridges 22 to radially reinforce that group of ridges. That radial reinforcement acts to resist the formation and propagation of the cracks in the carbide.

That is, the tendency of cracks to form at the bottoms of the ridges of the substrate 12 due to the "notch effect" is effectively resisted by the radial reinforcement provided by the ring portion 30 of the diamond layer. To that end, it will be appreciated that the ring portion 30 should extend downwardly at least as far as the grooves 24. That is, the floor 20 should be disposed no higher than the bases 23 of the grooves 24. If desired, the floor 20 could extend to a depth greater than that of the grooves as depicted in phantom in FIG. 1. Also, the width W is preferably greater than the width of the grooves and the width of the ridges.

The mixture of diamond particles used to form the diamond layer 14 comprises a homogenous mixture of fine particles. The grain size may vary in the range of 25 to 75 microns, and is preferably about 40 microns. The use of diamond comprised of fine particles (as opposed to coarse particles) maximizes the amount of shrinkage of the diamond ring 30 during cooling, thereby enhancing the radial reinforcement of the carbide ridges. In that regard, in a diamond layer comprised of fine particles the amount of void space between the particles is maximized. During the sintering process, such void space is occupied by the filler metal, such as cobalt, which sweeps through the diamond from the cemented carbide. The resulting diamond layer thus contains a greater percentage of cobalt than would a diamond comprised of coarse particles and exhibits a greater shrinkage during the cooling step. Consequently, the ridges are more strongly reinforced by the ring 30.

Moreover, a fine grain diamond possesses a higher abrasion resistance (e.g., on the order of roughly two to three times) and a higher transverse rupture strength (e.g., on the order of roughly four times) than a coarse grain diamond.

Furthermore, a compact according to the present invention has an impact strength which is on the order of about four times that of a known compact having no ridges and a diamond particle size of about 25 microns, and is on the order of about two times that of a conventional compact according to U.S. Pat. No. 4,784,023 having a diamond particle size of about 80 microns.

When tested, a compact according to the present invention has also exhibited a significantly higher number of drilling hours and considerably greater distances drilled, as compared with a compact having ridges according to U.S. Pat. No. 4,784,023.

Figure 2:
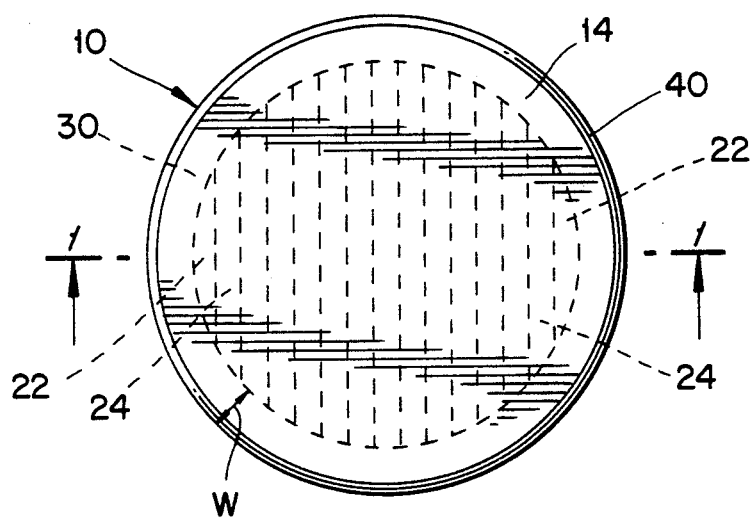
FIG. 2 is a plan view of the composite depicted in FIG. 1.
Figure 3:
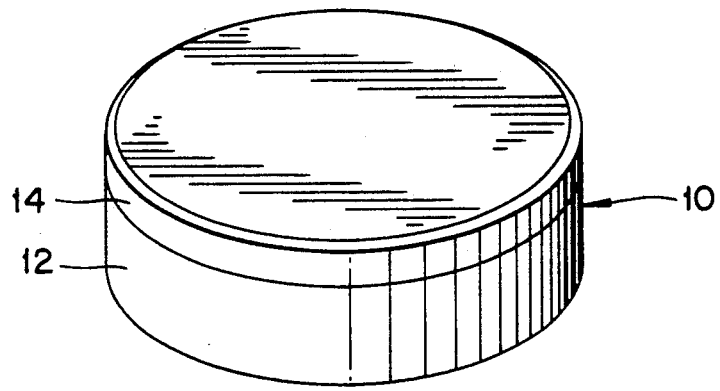
FIG. 3 is a perspective view of a composite according to the present invention.

The height of the ridges can be equal to or greater than the total height of the diamond layer as measured from the floor 20. The top surface of the diamond layer can be beveled around its outer edge as shown at 40 in FIGS. 1 and 2.

Figure 4:
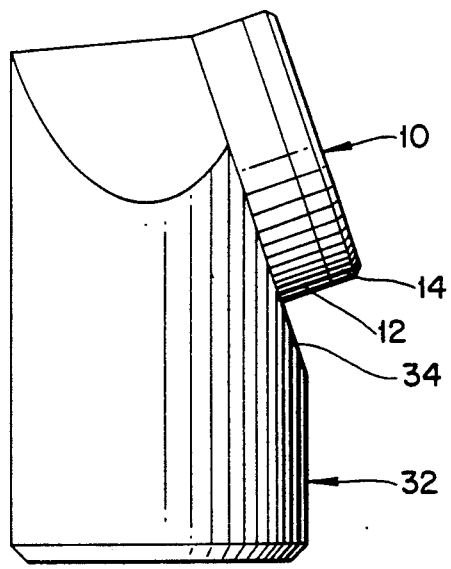
FIG. 4 is a side elevational view of a cutting element comprised of a stud carrying a composite according to the present invention.
Figure 5:
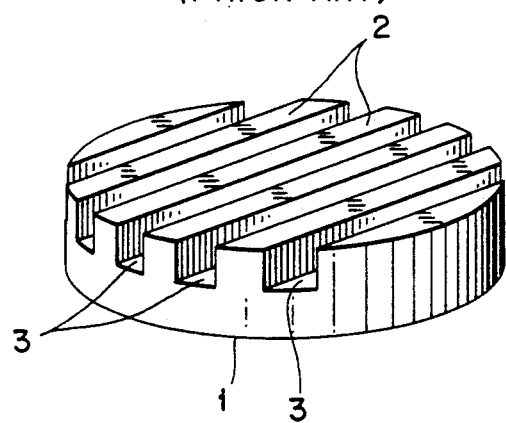
FIG. 5 is a perspective view of a prior art substrate.
Figure 6:
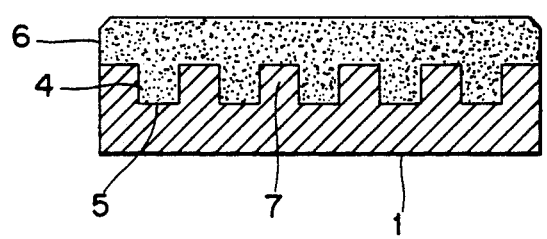
FIG. 6 is a cross-sectional view taken through a prior art composite which includes the substrate of FIG. 5.

The compact 10 can be mounted to a suitable support, such as a carbide stud 32 (FIG. 4) having a mounting surface 34 which is inclined at an oblique angle relative to the axis of the stud.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A composite for cutting in subterranean formations, comprising a substrate formed of cemented carbide and including a surface having a plurality of spaced apart ridges forming grooves therebetween, said ridges being spaced inwardly from an outer periphery of said substrate, and a sintered diamond layer adhered to said surface of said substrate and having a thickness greater than a depth of said grooves, said diamond comprised of a substantially uniform distribution of diamond particles, said diamond layer occupying said grooves to form diamond ridges interlocked with ridges of said substrate, said diamond layer including an annular ring portion completely surrounding said plurality of ridges and extending to a depth substantially equal to that of said grooves to provide radial reinforcement to the structure.

2. A composite according to claim 1, wherein said grain size is about 40 microns.

3. A composite according to claim 1, wherein said ridges are substantially parallel.

4. A composite according to claim 1, wherein a top surface of said diamond layer is beveled around its outer periphery.

5. A composite according to claim 1, wherein said diamond particles have a grain size no greater than about 75 microns.

6. A composite for cutting in subterranean formations, comprising a substrate formed of cemented carbide and including a surface having a plurality of spaced apart ridges forming grooves therebetween, said ridges being spaced inwardly from an outer periphery of said substrate, and a sintered diamond layer adhered to said surface of said substrate and having a thickness greater than a depth of said grooves, said diamond comprised of a substantially uniform distribution of diamond particles having a grain size greater than about 75 microns, said diamond layer occupying said grooves to form diamond ridges interlocked with ridges of said substrate, said diamond layer including an annular ring portion completely surrounding said plurality of ridges and extending to a depth at least equal to that of said grooves to provide radial reinforcement against the formation and propagation of cracks tending to occur in the substrate in the vicinity of said ridges.

* * * * *

UNITED STATES PATENT AND TRADEMARK OFFICE
CERTIFICATE OF CORRECTION

PATENT NO. : 5,120,327
DATED : June 9, 1992
INVENTOR(S) : Mahlon D. Dennis

It is certified that error appears in the above-identified patent and that said Letters Patent is hereby corrected as shown below:

In column 6, line 40, insert --no-- before "greater".

Signed and Sealed this

Eighteenth Day of July, 2000

Attest:

Q. TODD DICKINSON

*Attesting Officer*          *Director of Patents and Trademarks*